US012184795B2

(12) United States Patent
Lu et al.

(10) Patent No.: US 12,184,795 B2
(45) Date of Patent: Dec. 31, 2024

(54) PUF METHOD AND STRUCTURE

(71) Applicant: Taiwan Semiconductor Manufacturing Company Ltd., Hsinchu (TW)

(72) Inventors: Shih-Lien Linus Lu, Hsinchu (TW); Saman Adham, Kanata (CA); Yu-Der Chih, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 629 days.

(21) Appl. No.: 17/228,840

(22) Filed: Apr. 13, 2021

(65) Prior Publication Data

US 2021/0409233 A1 Dec. 30, 2021

Related U.S. Application Data

(60) Provisional application No. 63/044,741, filed on Jun. 26, 2020.

(51) Int. Cl.
*H04L 9/32* (2006.01)
*G06F 3/06* (2006.01)
(Continued)

(52) U.S. Cl.
CPC .......... *H04L 9/3278* (2013.01); *G06F 3/0623* (2013.01); *G06F 3/0659* (2013.01);
(Continued)

(58) Field of Classification Search
CPC ... H04L 9/3278; H04L 9/0861; G06F 3/0623; G06F 3/0659; G06F 3/0679; G06F 12/0646; G06F 21/75; G06F 2212/1052
See application file for complete search history.

(56) References Cited

U.S. PATENT DOCUMENTS

2009/0327709 A1\* 12/2009 Garner .................. G06F 21/123
  713/162
2017/0160987 A1\* 6/2017 Royer, Jr. ............. G06F 3/0653
(Continued)

FOREIGN PATENT DOCUMENTS

KR 20180041427 A 4/2018
TW 201901676 A 1/2019
(Continued)

OTHER PUBLICATIONS

Office Action issued in connection with Taiwan Appl. No. 10-2021-0076085 dated Sep. 21, 2023.
(Continued)

*Primary Examiner* — Hee K Song
(74) *Attorney, Agent, or Firm* — FOLEY & LARDNER LLP

(57) ABSTRACT

Disclosed herein is related to physical unclonable function (PUF) with enhanced security based on one time programmable (OTP) memory device. In one aspect, indirection process, hashing or a combination of them can be employed to hide a key for allowing access to an integrated circuit. Each indirection process may include identifying a subsequent address of the OTP memory device based on content stored by the OTP memory device at an address, and obtaining subsequent content stored by the OTP memory device at the subsequent address. Through a number of indirection processes, hidden content stored by the OTP memory device can be obtained. In one approach, hashing can be applied to input bits to obtain an address of the OTP memory device to apply. In one approach, hashing can be applied to the hidden content stored by the OTP memory device to generate the key.

20 Claims, 12 Drawing Sheets

(51) Int. Cl.
*G06F 12/06* (2006.01)
*G06F 21/75* (2013.01)
*H04L 9/08* (2006.01)

(52) U.S. Cl.
CPC ........ *G06F 3/0679* (2013.01); *G06F 12/0646* (2013.01); *G06F 21/75* (2013.01); *H04L 9/0861* (2013.01); *G06F 2212/1052* (2013.01)

(56) References Cited

U.S. PATENT DOCUMENTS

2019/0147967 A1* 5/2019 Tuyls ..................... G11C 17/18
365/96
2021/0294694 A1* 9/2021 Rigoni .................. G06F 3/0661

FOREIGN PATENT DOCUMENTS

| TW | 201921280 A | 6/2019 |
| TW | 202008205 A | 2/2020 |
| TW | 202009775 A | 3/2020 |
| WO | WO-2014/175538 A1 | 10/2014 |

OTHER PUBLICATIONS

Won-seok Choi et al., 'Design of PUF-Based Encryption Processor and Mutual Authentication Protocol for Low-Cost RFID Authentication, The Journal of Korean Institute of Communications and Information Sciences' 14-12 vol. 39B No. 12, Dec. 2014.

Dong-Kyu Kim, "PUF-based OTP token for mobile payment", Journal of the Korean Society for Multimedia vol. 19, No. Mar. 1, 2015 (12 pages).

Jong-Hak Paik et al., "Development of security chip technology using PUF technology and its applications", Journal of Electronic Engineering, Jul. 2016 (9 pages).

Jong-Hoon Lee et al., "OTP-Based Transaction Verification Protocol Using PUFs", Journal of the Korean Telecommunications Society, vol. 38B No. 06, May 27, 2013 (9 pages).

Request for the Submission of an Opinion issued in connection with Korean Appl. Ser. No. 10-2021-0076085 dated (Jul. 25, 2022 (10 pages).

* cited by examiner

PUF METHOD AND STRUCTURE

CROSS-REFERENCE TO RELATED APPLICATION

This application claims priority to and the benefit of U.S. Provisional Application No. 63/044,741, filed Jun. 26, 2020, entitled "PUF METHOD AND STRUCTURE", which is incorporated herein by reference in its entirety for all purposes.

BACKGROUND

A physically unclonable function (PUF) circuit is a circuit or a physical structure generally within an integrated circuit that provides a number of corresponding outputs in response to different inputs (e.g., challenges) applied to the PUF circuit. Different PUF circuits in different integrated circuits may generate different outputs based on physical characteristic of the integrated circuits, in response to the same inputs applied. Accordingly, the outputs of the PUF circuits can be implemented as unique identifications of the integrated circuits.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
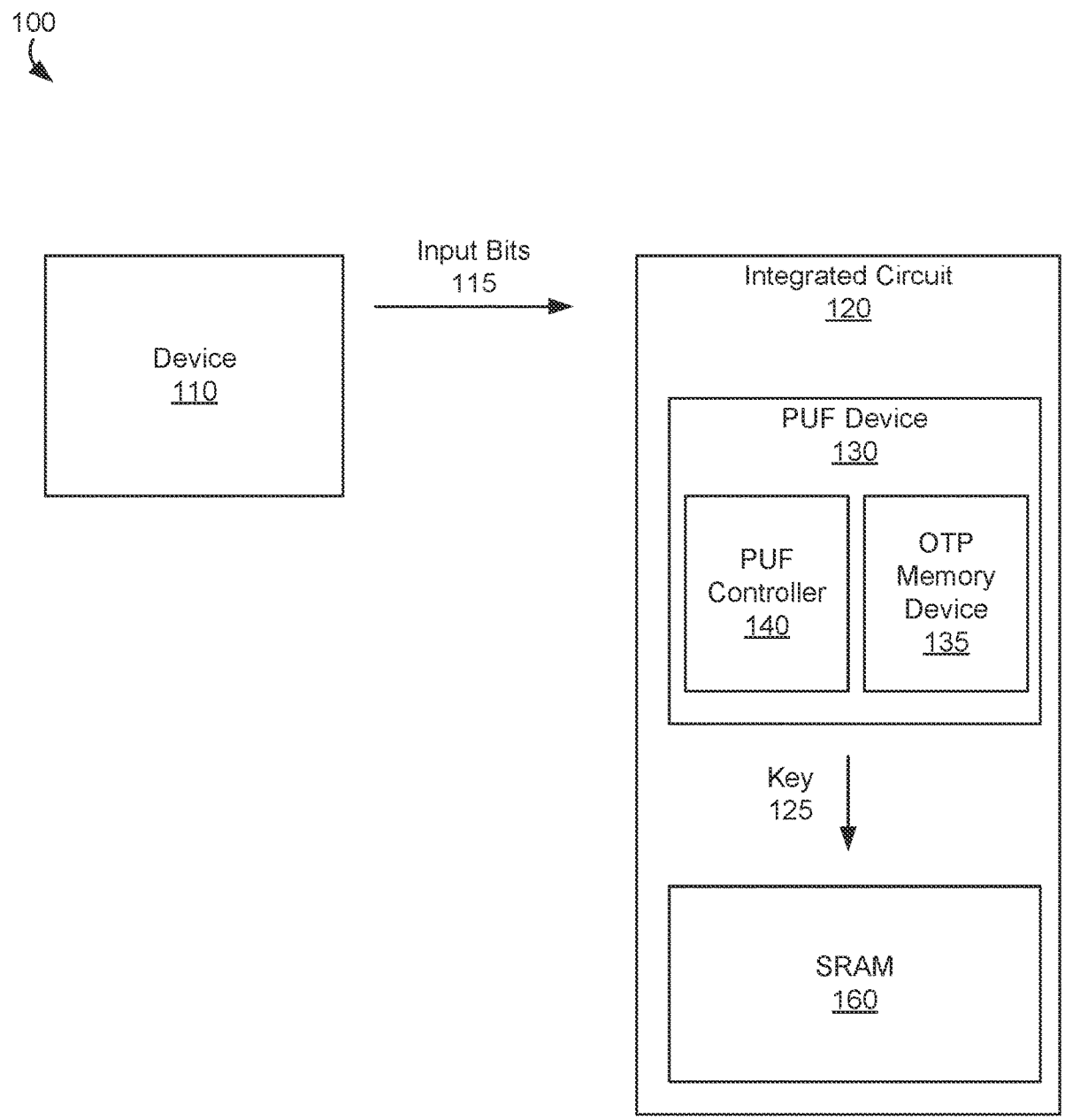
FIG. 1 is a diagram of a system including an integrated circuit and a server to access content stored by the integrated circuit, in accordance with one embodiment.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In accordance with some embodiments, an integrated circuit employs a PUF device for authentication. The PUF device may include a one-time programmable (OTP) memory device for storing hidden content, based on which a key can be generated. According to the key, content stored by a memory device (e.g., static random access memory (SRAM)) can be accessed. In one aspect, indirection process, hashing or a combination of them can be employed to hide content for generating the key. Each indirection process may include identifying a subsequent address of the OTP memory device based on content stored by the OTP memory device at an address, and obtaining subsequent content stored by the OTP memory device at the subsequent address. Through a number of indirection processes, hidden content stored by the OTP memory device can be obtained. In one approach, hashing can be applied to input bits to obtain an input address of the OTP memory device to apply, and hidden content can be obtained by applying the input address to the OTP memory device through indirection processes. In one approach, hashing can be applied to the hidden content stored by the OTP memory device to generate a key.

Advantageously, access to an integrated circuit can be secured by hiding content stored by an OTP memory device for generating a key. In one aspect, different OTP memory devices in different integrated circuits can store different content due to physical characteristics of the integrated circuits, such that content stored by each OTP memory device can be employed to identify an integrated circuit. However, content stored by the OTP memory device can be discovered through reverse engineering. By hiding content stored by the OTP memory device through indirection processes and by applying hashing, hidden content may not be easily discovered through reverse engineering. Moreover, a key for allowing access to the integrated circuit can be generated in a secure manner based on the hidden content stored by the OTP memory device.

FIG. 1 is a diagram of a system 100 including an integrated circuit 120 and a device 110 to access content stored by the integrated circuit 120, in accordance with one embodiment. In some embodiments, the device 110 is communicatively coupled to the integrated circuits 120 through a communication link (e.g., wired communication link or wireless network communication link). The device 110 may be any computing device (e.g., server, personal computer, table PC, mobile device, etc.). The integrated circuit 120 may be embodied as field programmable gate logic (FPGA), application specific integrated circuit (ASIC), or any combination thereof. In one approach, the device 110 transmits a set of input bits 115 to the integrated circuit 120 through the communication link to access content stored by the integrated circuit 120. The integrated circuit 120 may receive the set of input bits 115. In response to the set of input bits 115, the integrated circuit 120 may allow or disallow the device 110 to access content stored by the integrated circuit 120.

In some embodiments, the integrated circuit 120 includes a PUF device 130 and SRAM 160. The SRAM 160 may store data or content. In some embodiments, the SRAM 160 is replaced by another memory device that stores data. In one aspect, the SRAM 160 is encrypted to secure content stored by the SRAM 160. The SRAM 160 may be enabled or accessed, in response to a valid key 125. The PUF device 130 may receive the set of input bits 115 from the device 110 and generate a key 125 according to the set of input bits 115. The PUF device 130 may transmit the key 125 to the SRAM 160 to enable access to the content stored by the SRAM 160. In one aspect, the key 125 is generated and provided within the integrated circuit 120, such that the key 125 can be secured from an external device.

In some embodiments, the PUF device 130 includes a PUF controller 140 and an OTP memory device 135. The PUF controller 140 may be embodied as a processor, a state machine, a digital logic circuit, or any combination thereof. The PUF controller 140 may include programmed instructions when executed cause the PUF controller 140 to perform various functions described herein. The OTP memory device 135 may be embodied as a non-volatile memory device (e.g., a flash memory device, resistive random access memory (ReRAM), magnetoresistive random-access memory (MRAM), phase change random access memory (PCRAM), etc.). In one aspect, the OTP memory device 135 may store hidden content. The PUF controller 140 may obtain the hidden content from the OTP memory device 135 according to the set of input bits 115 and generate the key 125 for enabling access to the SRAM 160 based on the hidden content.

In one aspect, the OTP memory device 135 stores unique data according to physical characteristic of the OTP memory device 135. In one example, a high voltage can be applied to the OTP memory device 135, such that oxide break down may occur. The oxide breakdown is highly variable over different cells in the OTP memory device 135, due to the random nature of the thickness of the oxide and of the shape and quality of the oxide. According to the oxide breakdown, the OTP memory device 135 may store content that are unique or specific to the integrated circuit 120. Different content stored by the OTP memory device 135 may be located or identified by corresponding addresses.

In one aspect, the PUF controller 140 receives the set of input bits 115 from the device 110, and obtains hidden content stored by the OTP memory device 135 according to the set of input bits 115. The PUF controller 140 may generate the key 125 according to the set of input bits 115.

In one aspect, content stored by the OTP memory device 135 may be discovered through reverse engineering. For example, content stored by the OTP memory device 135 can be identified or inferred through atomic force microscopy (AFM) or electron beam induced current (EBIC). To protect content stored by the OTP memory device 135 from reverse engineering, indirection processes, hashing or a combination of them can be applied.

In one approach, the PUF controller 140 receives the set of input bits 115 and obtains an input address for applying to the OTP memory device 135 according to the set of input bits 115. The PUF controller 140 may obtain a portion of bits of the set of input bits 115 and obtain the input address based on the portion of the bits of the set of input bits 115. In one approach, the PUF controller 140 may apply the portion of bits to a hash function to generate the input address. The PUF controller 140 may apply the input address to the OTP memory device 135 to obtain the hidden content stored by the OTP memory device 135 through indirection processes. For each indirection process, the PUF controller 140 may apply an address to the OTP memory device 135, and obtain content stored by the OTP memory device 135 at the address. The PUF controller 140 may convert the obtained content into a subsequent address and apply the subsequent address to the OTP memory device 135. The PUF controller 140 may select a conversion process according to the set of input bits 115 and convert the content into the subsequent address through the selected conversion process. The PUF controller 140 may iteratively obtain subsequent content through indirection processes to obtain hidden content stored by the OTP memory device 135. The PUF controller 140 may perform the iteration processes for a predetermined number, or a number indicated by the set of input bits 115. The PUF controller 140 may generate the key 125 according to the hidden content from the PUF device 130. For example, the PUF controller 140 may apply the hidden content to a hash function to generate the key 125. The PUF controller 140 may transmit the key 125 to the SRAM 160 for enabling access to content stored by the SRAM 160. Detailed description on example operations and implementations of the PUF controller 140 are provided below with respect to FIGS. 2-11.

Figure 2:
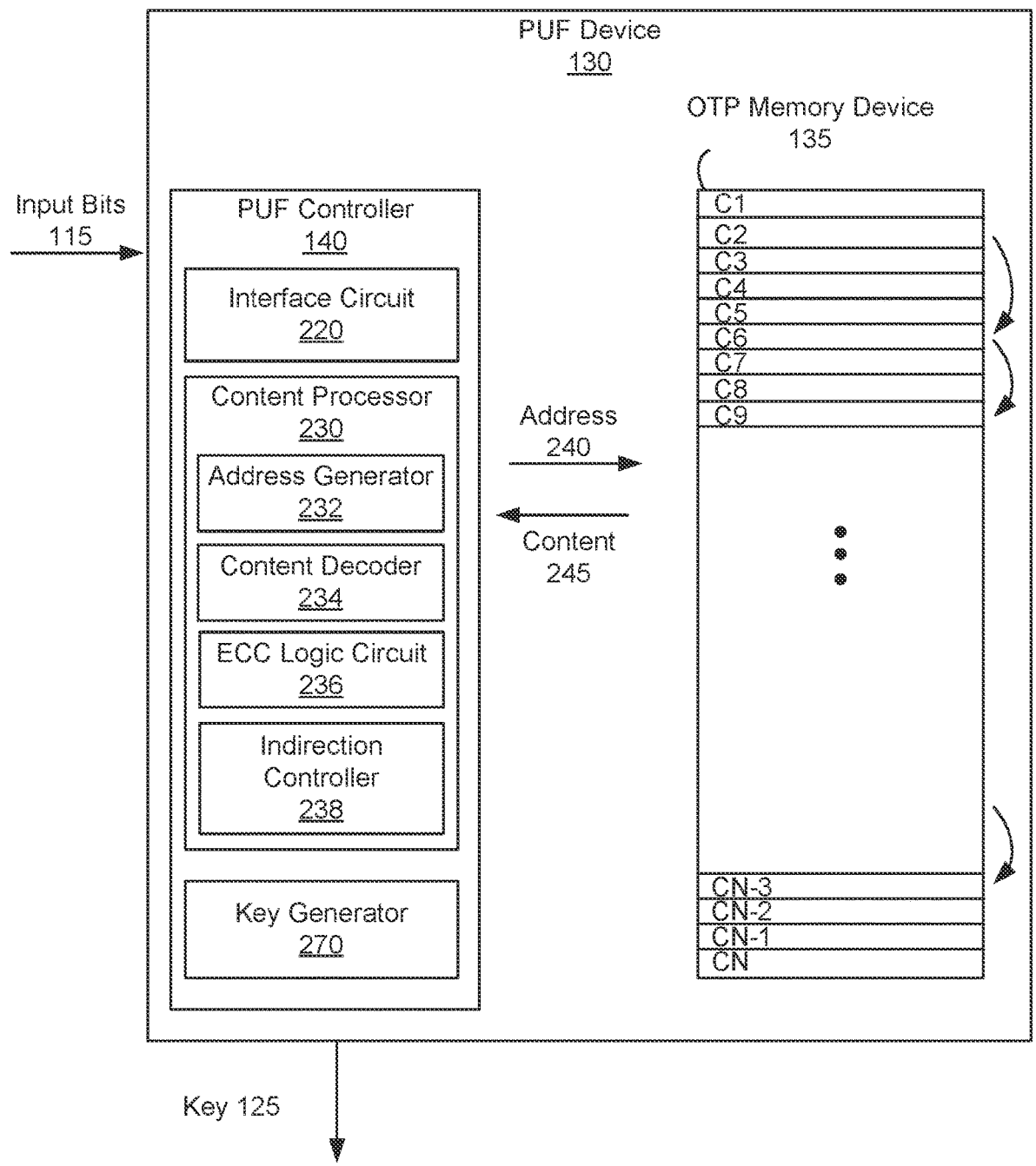
FIG. 2 is a diagram of a physical unclonable function (PUF) device including a memory device storing content and a PUF controller to hide the content stored by the memory device, in accordance with one embodiment.

FIG. 2 is a diagram of the PUF device 130 including the OTP memory device 135 storing content and the PUF controller 140 to hide the content stored by the OTP memory device 135, in accordance with one embodiment. In some embodiments, the OTP memory device 135 can store different content associated with different addresses C1, C2 . . . CN. In some embodiments, the PUF controller 140 includes an interface circuit 220, a content processor 230, and a key generator 270. These components of the PUF controller 140 may operate together to receive a set of input bits 115, and obtain hidden content 245 stored by the OTP memory device 135 based on the set of input bits 115 through indirection processes. Moreover, these components of the PUF controller 140 may operate together to generate the key 125 according to hidden content 245. In some embodiments, the PUF controller 140 includes more, fewer, or different components than shown in FIG. 2.

In some embodiments, the interface circuit 220 is a component that receives the set of input bits 115 and extracts information for generating the key 125. In one aspect, the set of input bits 115 includes a first portion corresponding to a challenge or an input address, a second portion indicative of a number of bits to shift to obtain the input address, a third portion indicative of a number of indirection processes to apply, a fourth portion indicative of a conversion process to apply for converting content stored by the OTP memory device 135 into a subsequent address, a fifth portion indicative of a number of bits to shift to generate the key 125, etc. An example of the set of input bits 115 is provided below with respect to FIG. 3. In one implementation, the interface circuit 220 includes a serial to parallel converter that converts serial bits into parallel bits, and registers that store corresponding portions in the parallel bits. The interface circuit 220 may provide different portions of the set of input bits 115 to the content processor 230.

In some embodiments, the content processor 230 is a component that applies an address 240 to the OTP memory device 135 and obtains hidden content 245 from the OTP memory device 135 through indirection processes. In some embodiments, the content processor 230 includes an address generator 232, a content decoder 234, an ECC logic circuit 236, and an indirection controller 238. These components may operate together to receive information from the interface circuit 220, and perform indirection processes, according to the received information. In some embodiments, the content processor 230 includes more, fewer, or different components than shown in FIG. 2.

In some embodiments, the address generator 232 is a component that obtains or generates an input address 240 to apply to the OTP memory device 135, according to the set of input bits 115. In one example, the address generator 232 applies the first portion of the set of input bits to a hash function to generate the input address 240. The address generator 232 may shift the first portion of the input bits 115 by a number of bits indicated by the second portion of the set of input bits 115 and apply the shifted portion to the hash function. An example hash function includes an XOR operation between the first portion of the set of input bits 115 and the shifted portion. Example implementation of the address generator 232 is provided below with respect to FIG. 7. The address generator 232 may apply the input address 240 to the OTP memory device 135. By generating the input address 240 according to a hash function, the input address 240 applied to the OTP memory device 135 can be hidden from an external device.

In some embodiments, the content decoder 234 is a component that receives content 245 from the OTP memory device 135 and converts the content 245 into a subsequent address 240. In one aspect, the content decoder 234 converts the content 245 having a first number of bits (e.g., 64 bits) into the subsequent address having a second number of bits (e.g., 5 bits) lower than the first number of bits. The content decoder 234 may receive the fourth portion of the set of input bits 115 indicative of a conversion process to perform and select the conversion process as indicated by the fourth portion of the set of bits 115. The content decoder 234 may convert the received content 245 from the OTP memory device 135 into a subsequent address 240 through the selected process. For example, a first conversion process may convert the received content 245 without ECC bits of the OTP memory device 135 into the subsequent address 240, and a second conversion process may convert the received content 245 with the ECC bits of the OTP memory device 135 into the subsequent address 240. Converting the content 245 without the ECC bits may simplify the conversion process, whereas converting the content 245 with the ECC bits may add complexity to secure the content stored by the OTP memory device 135. In one implementation, the content decoder 234 includes XOR gates that perform XOR operations among different portions of the received content 245 to reduce a number of bits. Example implementations and operations of the content decoder 234 are provided below with respect to FIGS. 4A and 4B.

In some embodiments, the ECC logic circuit 236 is a circuit that performs ECC corrections on the received content 245 from the OTP memory device 135. In one aspect, the ECC logic circuit 236 can receive ECC bits stored by the OTP memory device 135 and perform correction on the received content 245 through ECC based on the ECC bits. By performing correction on the received content, error bits in the content 245 from the OTP memory device 135 can be corrected.

In some embodiments, the indirection controller 238 is a circuit that performs indirection processes to obtain the hidden content 245. The indirection controller 238 may include a counter that stores a number of indirection processes remaining to apply. The indirection controller 238 may receive the third portion of the input bits 115 indicative of the number of indirection processes to apply to obtain the hidden content 245 and set the counter to store or hold the number indicated by the third portion of the input bits 115. For an indirection process, the indirection controller 238 may configure the content decoder 234 to convert the received content 245 from the OTP memory device 135 into a subsequent address 240 and apply the subsequent address 240 to the OTP memory device 135 to obtain subsequent content. When the subsequent address 240 is applied to the OTP memory device 135, the indirection controller 238 may reduce the number stored by the counter, for example, by one. The indirection controller 238 may determine whether a remaining indirection process to apply exists or not according to the number stored by the counter. For example, the indirection controller 238 compares the number stored by the counter with a predetermined number (e.g., '1' or '0') to determine whether a remaining indirection process to apply exists or not. In response to the indirection controller 238 determining that the number stored by the counter is different from the predetermined number, the indirection controller 238 may determine that a remaining indirection process to apply exists and may cause or configure the content decoder 234 to perform an additional indirection process. In response to the indirection controller 238 determining that the number stored by the counter is equal to the predetermined number, the indirection controller 238 may determine that no more indirection process to apply exists and provide the last content 245 received from the OTP memory device 135 to the key generator 270 as the hidden content 245.

In one aspect, the key generator 270 is a component that receives the hidden content and generates the key 125 according to the hidden content received. In one aspect, the key generator 270 generates the key 125 by applying the hidden content to a hash function. For example, the key generator 270 may shift the first portion of the input bits 115 indicative of the input address by a number of bits indicated by the fifth portion of the set of input bits 115 and apply the shifted portion to the hash function. An example hash function includes an XOR operation between an address corresponding to the hidden content 245 from the OTP memory device 135 and the shifted portion. Example implementation of the key generator 270 is provided below with respect to FIG. 8. The key generator 270 may transmit the key 125 to the SRAM device 160 to enable access to content stored by the SRAM device 160. By generating the key 125 according to a hash function based on the hidden content 245, the hidden content 245 stored by the OTP memory device 135 can be hidden from an external device and the key 125 can be generated in a secure manner.

Figure 3:
FIG. 3 is a diagram of a set of input bits applied to an integrated circuit, in accordance with one embodiment.

FIG. 3 is a diagram of an example set of input bits 115 applied to the integrated circuit 120, in accordance with one embodiment. As described above with respect to FIG. 2, the set of input bits 115 may include a first portion 310 corresponding to a challenge or an input address 240, a second portion 320 indicative of a number of bits to shift to obtain the input address 240, a third portion 330 indicative of a number of indirection processes to apply, a fourth portion 340 indicative of a conversion process to apply for converting content 245 stored by the OTP memory device 135 into a subsequent address 240, and a fifth portion 350 indicative of a number of bits to shift to generate the key 125. The interface circuit 220 may receive the set of input bits 115 from the device 110 and obtain different information from the set of input bits 115. Moreover, the interface circuit 220 may provide the obtained information to the content processor 230, by which indirection processes can be performed according to the obtained information.

Figure 4A:
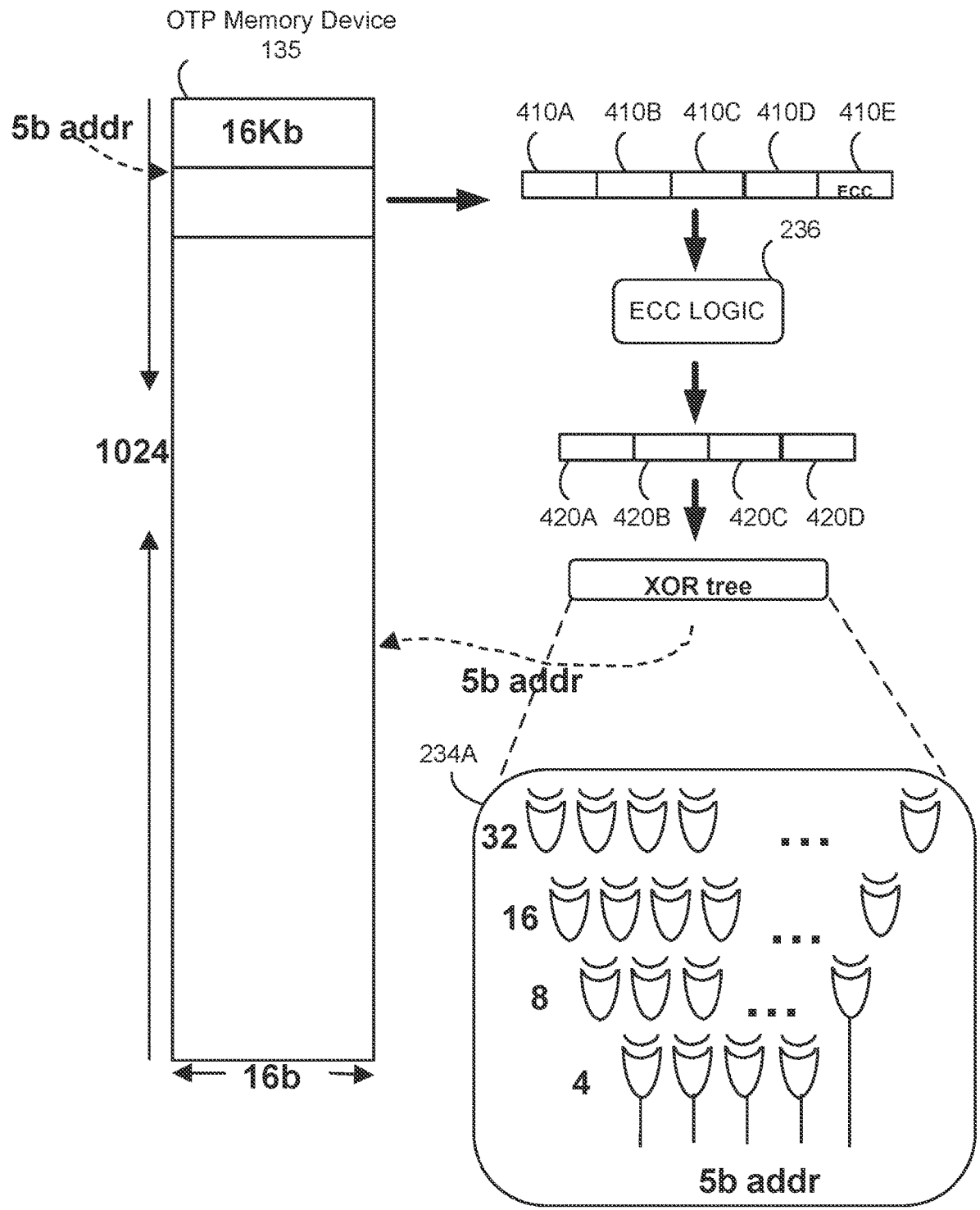
FIG. 4A is a diagram showing an example indirection process, in accordance with one embodiment.

FIG. 4A is a diagram showing an example indirection process, in accordance with one embodiment. In one example, the indirection controller 238 causes or configures the content decoder 234A to convert content 410A, 410B . . . 410E into a subsequent address. In the example shown in FIG. 4A, the OTP memory device 135 can store 1024 rows of content, where each row includes 16 bits. Each row may be identified by a corresponding 5 bit address. In one approach, in response to an address applied to the OTP memory device 135, the OTP memory device 135 may output content 410A, 410B, 410C, 410D, 410E in five rows. In one example, the content 410A, 410B, 410C, 410D can collectively represent 64 bits of information for a subsequent address or the key 125. In one example, the content 410E includes ECC bits. The ECC logic circuit 236 may perform ECC correction on the content 410A-410D according to the ECC bits in the content 410E to generate the ECC corrected content 420A-420D. The content decoder 234A may receive ECC corrected content 420A-420D from the ECC logic circuit 236 and convert the ECC corrected content 420A-420D into a 5 bit address.

In one implementation, the content decoder 234A includes a set of XOR gates. In one example, the content decoder 234A includes four levels of XOR gates, where the first level includes 32 of 2-bit XOR gates, the second level includes 16 of 2-bit XOR gates, the third level includes 8 of 2-bit XOR gates, and the fourth level includes 4 of 2-bit XOR gates. In the first level, XOR operation may be performed for each bit of the 32 bits of the ECC corrected content (e.g., 420A, 420B) and a corresponding bit of the remaining 32 bits of the ECC corrected content (e.g., 420C, 420D). Similarly, in the second level, XOR operation may be performed for each bit of the 16 bit output from the first level and a corresponding bit of the remaining 16 bit output from the first level. Similarly, in the third level, XOR operation may be performed for each bit of the 8 bit output from the second level and a corresponding bit of the remaining 8 bit output from the second level. In the fourth level, XOR operation may be performed for each bit of the 4 bit output from the third level and a corresponding bit of other 4 bit output from the third level. The 4 bit output from the fourth level and 1 bit output from the third level not applied as input to the fourth level can be output as 5 bit address 240. The 5 bit address 240 may be applied to the OTP memory device 135 to obtain subsequent content 245.

Figure 4B:
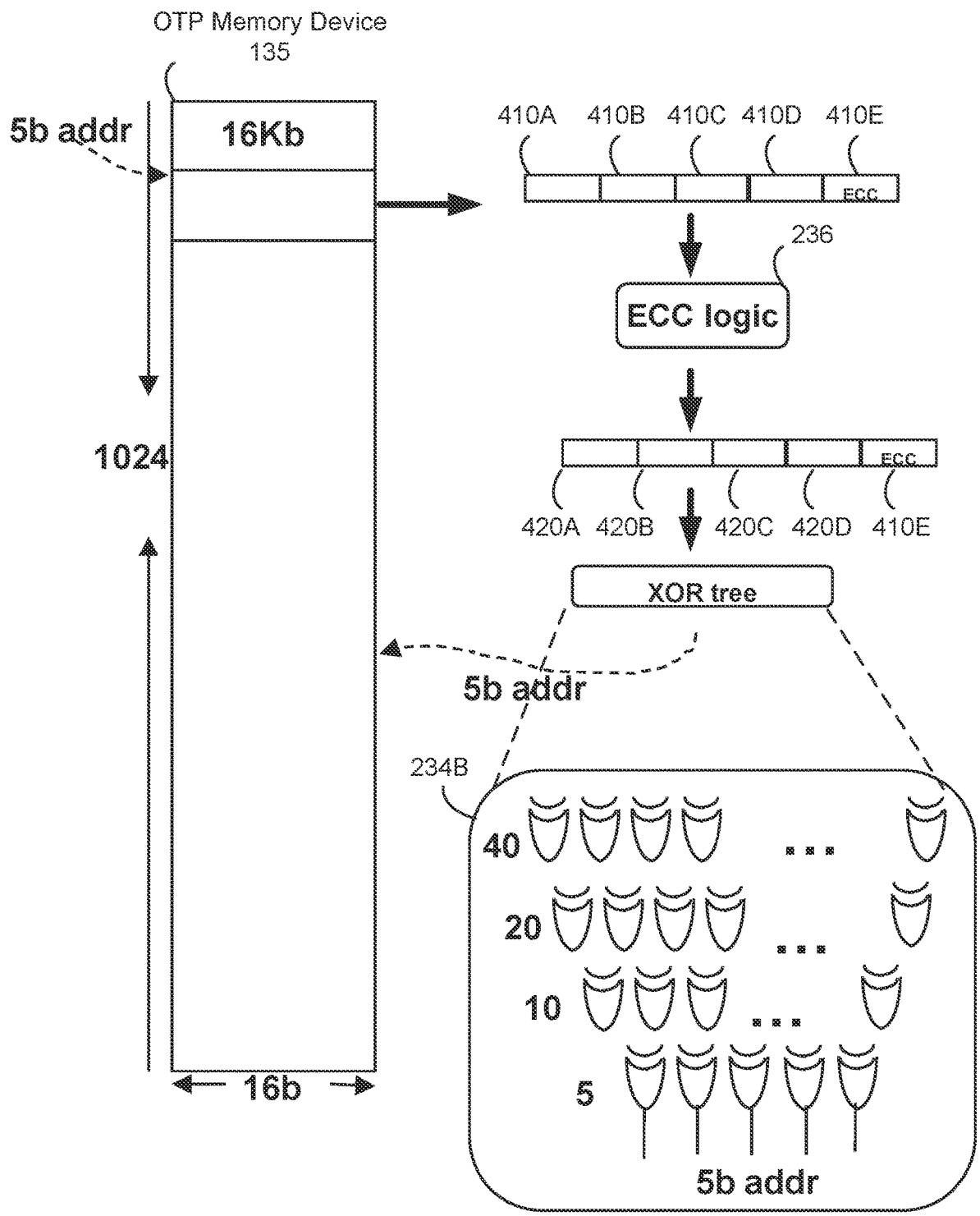
FIG. 4B is a diagram showing an example indirection process, in accordance with one embodiment.

FIG. 4B is a diagram showing an example indirection process, in accordance with one embodiment. The example shown in FIG. 4B is similar to the example shown in FIG. 4A, except the content 410E including ECC bits and the ECC corrected content 420A-420D are applied to the content decoder 234B as input. Accordingly, the content decoder 234B may receive 80 bits of input bits. In one example, the content decoder 234B includes four levels of XOR gates, where the first level includes 40 of 2-bit XOR gates, the second level includes 20 of 2-bit XOR gates, the third level includes 10 of 2-bit XOR gates, and the fourth level includes 5 of 2-bit XOR gates. In the first level, XOR operation may be performed for each bit of the 40 bits of the ECC corrected content (e.g., 420A, 420B) and a corresponding bit of the remaining 40 bits of the ECC corrected content (e.g., 420C, 420D). Similarly, in the second level, XOR operation may be performed for each bit of the 20 bit output from the first level and a corresponding bit of the remaining 20 bit output from the first level. Similarly, in the third level, XOR operation may be performed for each bit of the 10 bit output from the second level and a corresponding bit of the remaining 10 bit output from the second level. In the fourth level, XOR operation may be performed for each bit of the 5 bit output from the third level and a corresponding bit of the remaining 5 bit output from the third level. The 5 bit output from the fourth level can be output as a 5 bit address 240. The 5 bit address 240 may be applied to the OTP memory device 135 to obtain subsequent content 245.

In one aspect, the content decoder 234A of FIG. 4A includes less number of XOR gates than the content decoder 234B of FIG. 4B, such that the content decoder 234A may consume less area and power. Meanwhile, the content decoder 234B can generate the 5 bit address 240 based on the ECC bits, such that the content decoder 234B can generate the 5 bit address 240 with an additional complexity.

Figure 5:
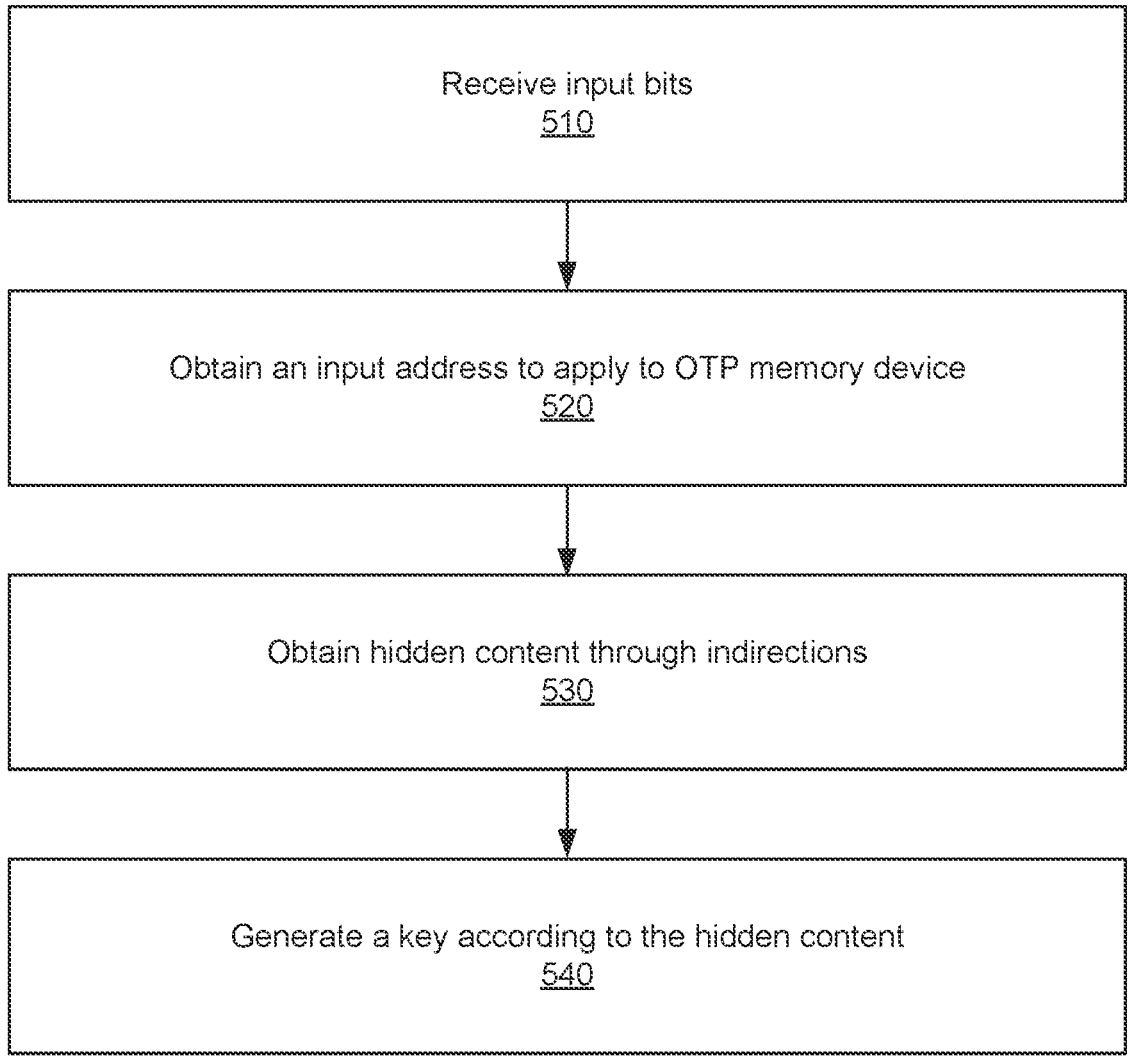
FIG. 5 is a flowchart showing an example process of generating a key through indirection processes, in accordance with some embodiments.

FIG. 5 is a flowchart showing an example process 500 of generating the key 125 through indirection processes, in accordance with some embodiments. In one example, the process 500 is performed by the PUF controller 140. In some embodiments, the process 500 is performed by other entities. In some embodiments, the process 500 includes more, fewer, or different operations than shown in FIG. 5.

In an operation 510, the PUF controller 140 receives a set of input bits 115. The PUF controller 140 may receive the string of input bits from the device 110 through a communication link (e.g., wired communication link or wireless communication link).

In an operation 520, the PUF controller 140 obtains an input address to apply to the OTP memory device 135. In one approach, the set of input bits 115 includes different portions. For example, the set of input bits 115 includes a first portion 310 corresponding to a challenge or an input address 240, a second portion 320 indicative of a number of bits to shift to obtain the input address 240, a third portion 330 indicative of a number of indirection processes to apply, a fourth portion 340 indicative of a conversion process to apply for converting content 245 stored by the OTP memory device 135 into a subsequent address 240, and a fifth portion 350 indicative of a number of bits to shift to generate the key 125. In one example, the PUF controller 140 applies the first portion 310 of the set of input bits to a hash function to generate the input address 240. The PUF controller 140 may shift the first portion 310 of the input bits 115 by a number of bits indicated by the second portion 320 of the set of input bits 115 and apply the shifted portion to the hash function. An example hash function includes an XOR operation between the first portion 310 of the set of input bits 115 and the shifted portion. The PUF controller 140 may also obtain different information from the set of input bits 115 for other operations (e.g., operations 530, 540).

In an operation 530, the PUF controller 140 obtains hidden content 245 stored by the OTP memory device 135 through indirection processes. In one approach, the PUF controller 140 applies the input address 240 to the OTP memory device 135 and obtains hidden content 245 stored by the OTP memory device 135 at a hidden address different from the input address 240. The PUF controller 140 may perform the indirection processes according to the number indicated by the third portion 330 of the set of input bits 115, and a conversion process indicated by the fourth portion 340 of the set of input bits 115.

In an operation 540, the PUF controller 140 generates a key 125 according to the hidden content 245. In one approach, the PUF controller 140 generates the key 125 by applying the hidden content 245 to a hash function. For example, the key generator 270 may shift the first portion 310 of the input bits 115 indicative of the input address by a number of bits indicated by the fifth portion 350 of the set of input bits 115 and apply the shifted portion to the hash function. An example hash function includes an XOR operation between i) an address corresponding to the hidden content 245 from the OTP memory device 135 and ii) the shifted portion. By hiding content 245 stored by the OTP memory device 135 through indirection processes and by applying hashing, the hidden content 245 may not be easily discovered through reverse engineering. Moreover, the key 125 for accessing the SRAM 160 can be generated in a secure manner.

Figure 6:
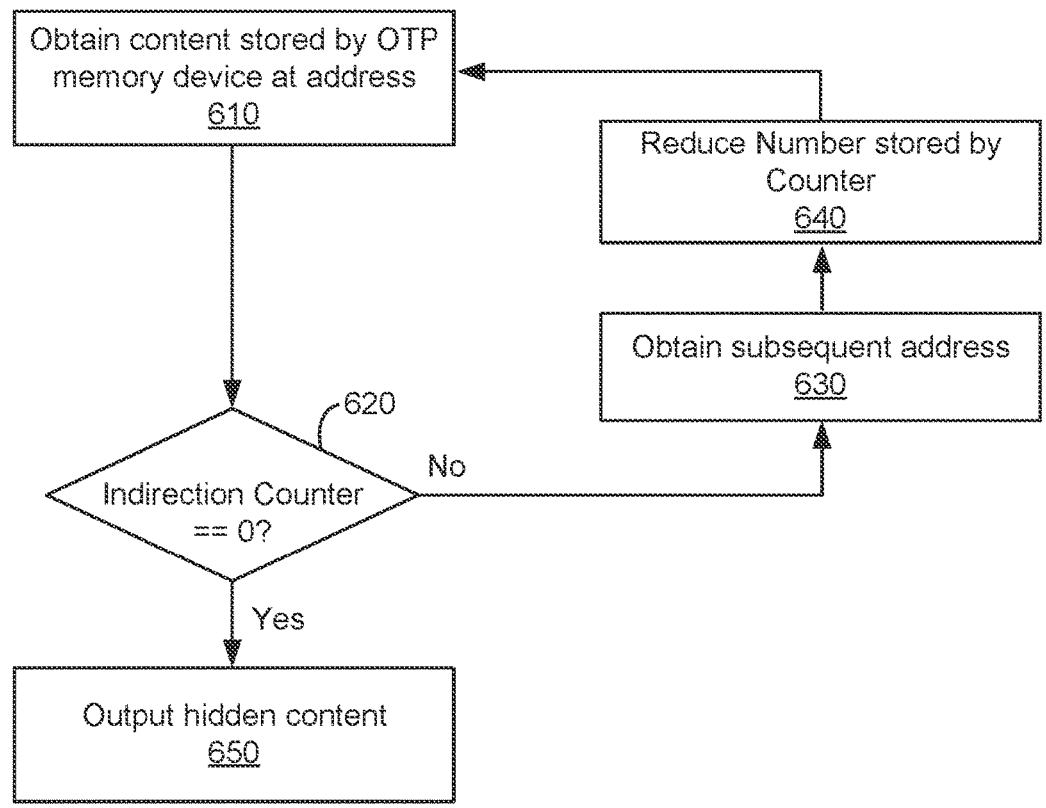
FIG. 6 is a flowchart showing an example process of obtaining hidden content through indirection processes, in accordance with some embodiments.

FIG. 6 is a flowchart showing an example operation 530 of obtaining hidden content 245 through indirection processes, in accordance with some embodiments. In one example, the operation 530 is performed by the PUF controller 140. In some embodiments, the operation 530 is performed by other entities. In some embodiments, the operation 530 includes more, fewer, or different operations than shown in FIG. 6.

In an operation 610, the PUF controller 140 obtains content stored by the OTP memory device 135 at an address. The address may be an input address obtained based on the set of input bits 115 from the operation 520. The PUF controller 140 may apply the address to the OTP memory device 135, and receive the content stored by the OTP memory device 135 at the address.

In an operation 620, the PUF controller 140 determines whether a remaining indirection process to perform exists or not. The PUF controller 140 may include a counter that stores a number of indirection processes remaining to apply. The PUF controller 140 may receive the third portion of the input bits 115 indicative of the number of indirection processes to apply and set the counter to store or hold the number indicated by the third portion of the input bits 115. The PUF controller 140 may determine whether a remaining indirection process to apply exists or not according to the number stored by the counter. For example, the PUF controller 140 compares the number stored by the counter with a predetermined number (e.g., '1' or '0'). In response to the number stored by the counter being different from or larger than the predetermined number, the PUF controller 140 may determine that a remaining indirection process to apply exists and proceed to an operation 630. In response to the number stored by the counter being equal to the predetermined number, the PUF controller 140 may determine that remaining indirection process to apply does not exist and proceed to an operation 650.

In the operation 630, the PUF controller 140 obtains a subsequent address 240 to apply according to the content 245 obtained in the operation 610. The PUF controller 140 may select a conversion process indicated by the fourth portion 340 of the set of input bits 115 and apply the selected conversion process to the content 245 to obtain the subsequent address 240. The PUF controller 140 may apply ECC correction on the content 245 and perform XOR operations on the ECC corrected bits of the content to obtain the subsequent address 240 having a fewer number of bits than the content 245, as described above with respect to FIGS. 4A and 4B.

In an operation 640, after obtaining the subsequent address 240, the PUF controller 140 may reduce the number or a value stored by the counter, for example, by one. The PUF controller 140 may apply the subsequent address 240 to the OTP memory device 135 and proceed to the operation 610.

In the operation 650, in response to the number stored by the counter being equal to the number indicated by the third portion 330 of the set of input bits 115, the PUF controller 140 may provide the last content 245 received from the OTP memory device 135 to the key generator 270 as the hidden content 245.

Figure 7:
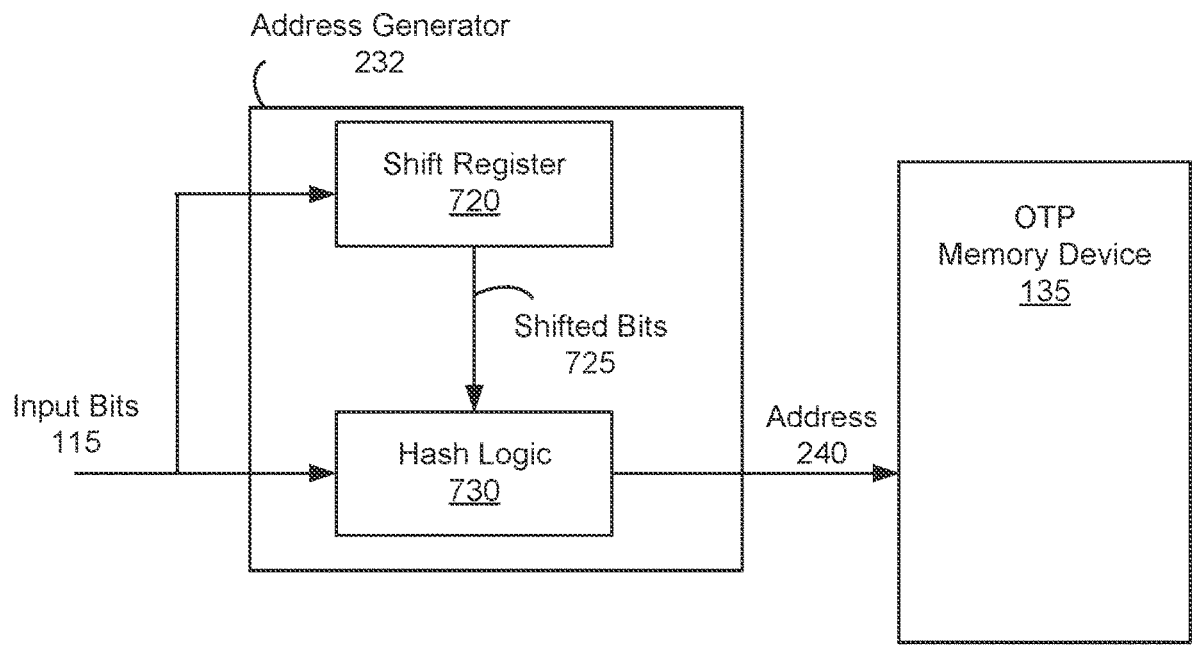
FIG. 7 is a diagram showing an address generator to obtain an address to apply based on a hash function, in accordance with some embodiments.

FIG. 7 is a diagram showing the address generator 232 to obtain an address to apply based on a hash function, in accordance with some embodiments. In some embodiments, the address generator 232 includes a shift register 720 and a hash logic circuit 730. These components may operate together to receive the set of input bits 115 (or the first portion 310 of the set of input bits 115) and obtain the address 240 for applying to the OTP memory device 135. In some embodiments, the address generator 232 includes more, fewer, or different components than shown in FIG. 7.

In some embodiments, the shift register 720 is a component that shifts the input bits 115 (or the first portion 310 of the set of input bits 115) by a number. The number of bits to shift may be indicated by a second portion 320 of the set of input bits 115. Example implementations of the shift register 720 are provided below with respect to FIGS. 8 and 9. The shift register 720 may shift the input bits 115 (or the first portion 310 of the set of input bits 115) to obtain the shifted bits 725, and provide the shifted bits 725 to the hash logic circuit 730.

In some embodiments, the hash logic circuit 730 is a component that receives the input bits 115 (or the first portion 310 of the set of input bits 115) and the shifted bits 725, and generates the input address 240 to apply according to the input bits 115 (or the first portion 310 of the set of input bits 115) and the shifted bits 725. In one approach, the hash logic circuit 730 applies the input bits 115 (or the first portion 310 of the set of input bits 115) and the shifted bits 725 to a hash function to generate the input address 240. Example hash operation includes an XOR operation. In one example, the hash logic circuit 730 includes a set of XOR gates that performs XOR operation for each bit of the input bits 115 (or the first portion 310 of the set of input bits 115) with a corresponding bit of the shifted bits 725 to generate the input address 240. The hash logic circuit 730 may provide the input address 240 to the OTP memory device 135. By generating the input address 240 based on the input bits 115 through the shift register 720 and the hash logic circuit 730, the input address 240 applied to the OTP memory device 135 for generating the key 125 may not be exposed to an external device.

Figure 8:
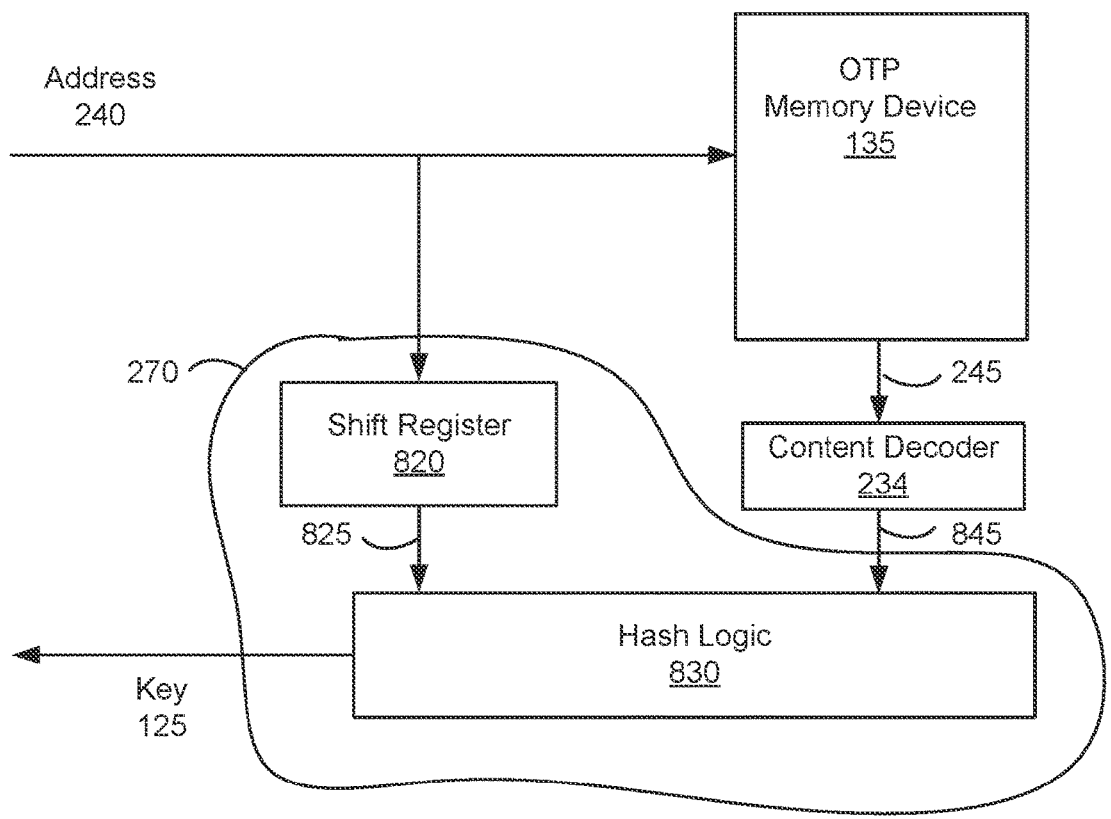
FIG. 8 is a diagram showing a key generator to generate a key based on a hash function, in accordance with some embodiments.

FIG. 8 is a diagram showing the key generator 270 to generate the key 125 based on a hash function, in accordance with some embodiments. In some embodiments, the key generator 270 includes a shift register 820 and a hash logic circuit 830. These components may operate together to receive the input address 240, and an address 845 corresponding to the hidden content 245 from the content decoder 234 and generate the key 125 for applying to the OTP memory device 135 according to the input address 240 and the address 845. In some embodiments, the key generator 270 includes more, fewer, or different components than shown in FIG. 8.

In some embodiments, the shift register 820 is a component that receives the address 240 for example, from the address generator 232, and shifts the bits (e.g., 5 bits) in the address 240 by a number. The number of bits to shift may be indicated by a fifth portion 350 of the set of input bits 115. The shift register 820 may shift the bits of the address 240 to obtain the shifted bits 825, and provide the shifted bits 825 to the hash logic circuit 830.

In some embodiments, the hash logic circuit 830 is a component that receives the shifted bits 825 from the shift register 820 and the address 845 from the content decoder 234 and generates the key 125 according to the shifted bits 825 and the address 845. In one approach, the hash logic circuit 830 applies the shifted bits 825 and the address 845 to a hash function to generate the key 125. Example hash operation includes an XOR operation. In one example, the hash logic circuit 830 includes a set of XOR gates that performs XOR operation for each bit of the shifted bits 825 with a corresponding bit of the address 845 to generate the key 125. The hash logic circuit 830 may provide the key 125 to the SRAM 160 to enable access to the SRAM 160. By generating the key 125 based on the hidden content 245 and the input address 240 through the shift register 820 and the hash logic circuit 830, the hidden content 245 for generating the key 125 may not be exposed to an external device. Moreover, the key 125 can be generated in a secure manner.

Figure 9:
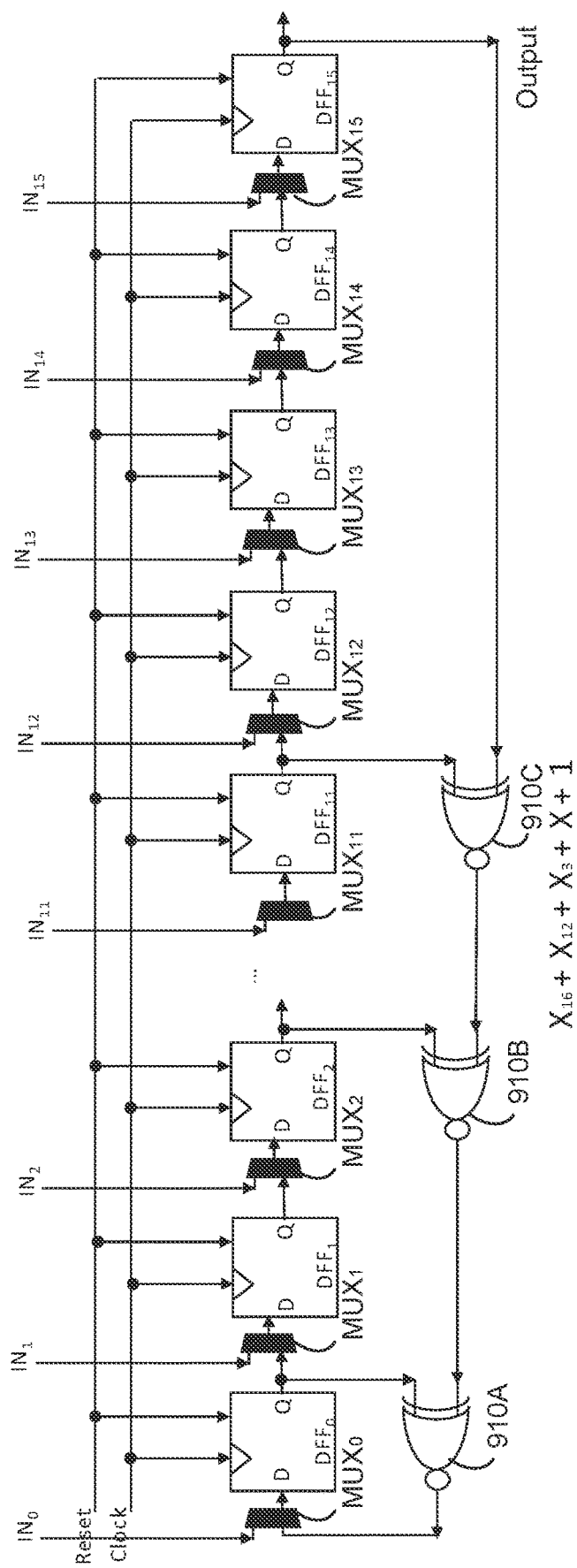
FIG. 9 is a diagram showing an example shift register, in accordance with some embodiments.

FIG. 9 is a diagram showing an example shift register 900, in accordance with some embodiments. The shift register 900 may be the shift register 720 of FIG. 7. In some embodiments, the shift register 900 includes a set of flip flops $DFF_0$, $DFF_1$ ... $DFF_{15}$, a set of multiplexers $MUX_0$, $MUX_1$ ... $MUX_{15}$, and XNOR gates 910A, 910B, 910C. In one configuration, a first input of the multiplexer $MUX_0$ receives an input bit $IN_0$, and a second input of the multiplexer $MUX_0$ is connected to an output of the XNOR gate 910A. In one configuration, an input D of the flip flop $DFF_0$ is connected to an output of the multiplexer $MUX_0$. Each multiplexer $MUX_i$ includes a first input to receive a corresponding bit of input $IN_i$, and a second input coupled to an output of a preceding flip flop $DFF_{i-1}$. Each flip flop $DFF_i$ includes an input D connected to an output of the corresponding multiplexer $MUX_i$. In one configuration, the output Q of the flip flop $DFF_{15}$ is connected to an input of the XNOR gate 910C. In one configuration, the output Q of the flip flop $DFF_{11}$ is connected to another input of the XNOR gate 910C. In one configuration, the output of the XNOR gate 910C is connected to an input of the XNOR gate 910B. In one configuration, the output Q of the flip flop $DFF_2$ is connected to another input of the XNOR gate 910B. In one configuration, the output of the XNOR gate 910B is connected to an input of the XNOR gate 910A. In this configuration, the multiplexers $MUX_0$ ... $MUX_{15}$ can be configured to provide the input bits $In_0$ ... $In_{15}$ to inputs of the flip flops $DFF_0$ ... $DFF_{15}$. After providing the inputs bits $In_0$ ... $In_{15}$ to inputs of the flip flops $DFF_0$ ... $DFF_{15}$, the shift register 900 may shift the input bits according to the function $X_{16}+X_{12}+X_3+X_1+1$.

Figure 10:
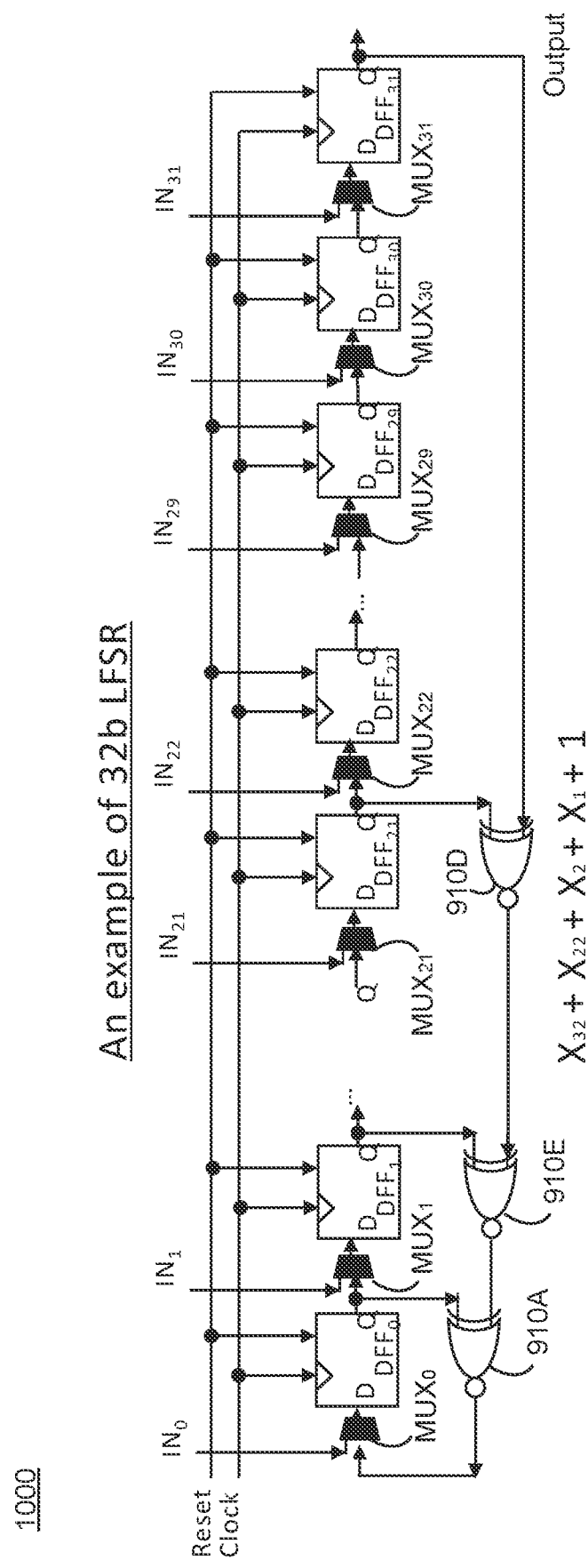
FIG. 10 is a diagram showing an example shift register, in accordance with some embodiments.

FIG. 10 is a diagram showing an example shift register 1000, in accordance with some embodiments. The shift register 1000 may be the shift register 720 of FIG. 7. In one aspect, the shift register 1000 is similar to the shift register 900 of FIG. 9, except the shift register 1000 includes additional multiplexers $MUX_{16}$ ... $MUX_{31}$, additional flip flops $DFF_{16}$ ... $DFF_{31}$, and XNOR gates 910D, 910E without the XNOR gates 910C, 910B. Thus, duplicated description thereof is omitted herein for the sake of brevity. In one aspect, the output of the flip flop $DFF_{31}$ is connected to an input of the XNOR gate 910D. In one aspect, the output of the flip flop $DFF_{21}$ is connected to another input of the XNOR gate 910D. In one aspect, the output of the XNOR gate 910D is connected to an input of the XNOR gate 910E. In one aspect, the output of the flip flop $DFF_1$ is connected to another input of the XNOR gate 910E. In one aspect, the output of the XNOR gate 910E is connected to an input of the XNOR gate 910A. In this configuration, the multiplexers $MUX_0$ ... $MUX_{31}$ can be configured to provide the input bits $In_0$ ... $In_{31}$ to inputs of the flip flops $DFF_0$ ... $DFF_{31}$. After providing the inputs bits $In_0$ ... $In_{31}$ to inputs of the flip flops $DFF_0$ ... $DFF_{31}$, the shift register 1000 may shift the input bits according to the function $X_{32}+X_{22}+X_2+X_1+1$.

Figure 11:
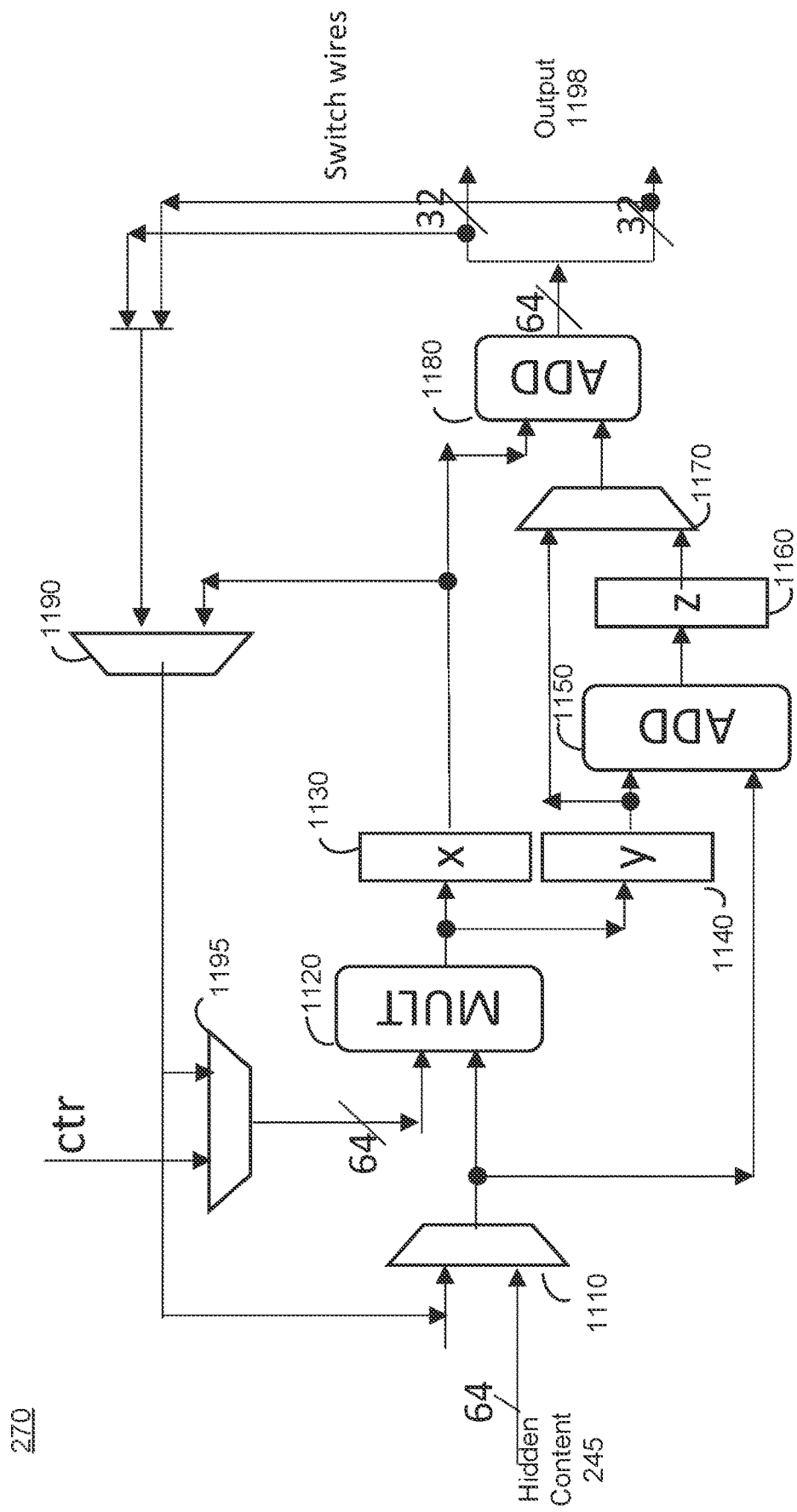
FIG. 11 is a diagram showing an example key generator, in accordance with some embodiments.

FIG. 11 is a diagram showing an example key generator 270, in accordance with some embodiments. In some embodiments, the key generator 270 includes multiplexers 1110, 1170, 1190, 1195, multiplier 1120, adders 1150, 1180, and registers 1130, 1140, 1160. These components may operate together to receive the hidden content 245, for example, from the OTP memory device 135 stored at the hidden address 240 and generate the output 1198 according to the hidden content 245. In some embodiments, the key generator 270 includes more, fewer, or different components than shown in FIG. 11.

In one configuration, the multiplexer 1110 includes a first input connected to the OTP memory device 135 to receive 64 bit input, and a second input connected to 64 bit output of the multiplexer 1190. In one configuration, the multiplexer 1110 includes 64 bit output connected to a first input of the multiplier 1120 and a first input of the adder 1150. In one configuration, the multiplier 1120 includes a second input connected to 64 bit output of the multiplexer 1195. The multiplier 1120 also includes 64 bit output connected to an input of the register 1130 and an input of the register 1140. In one configuration, the 64 bit output of the register 1130 is connected to a first input of the adder 1180 and a first input of the multiplexer 1190. In one configuration, the 64 bit output of the register 1140 is connected to a first input of the multiplexer 1170 and a second input of the adder 1150. In one configuration, the adder 1150 includes 64 bit output connected to an input of the register 1160, and the register 1160 includes 64 bit output connected to a second input of the multiplexer 1170. In one aspect, the multiplexer 1170 includes 64 bit output connected to a second input of the adder 1180. In one configuration, the adder 1180 includes 64 bit output connected to a second input of the multiplexer 1190. In one aspect, 32 bit of the output of the adder 1180 is swapped with or shifted by the other 32 bit of the output of the adder 1180 and the swapped output of the adder 1180 is provided to the second input of the multiplexer 1190. The output 1198 of the adder 1180 may be provided as the key 125. In one configuration, the multiplexer 1190 includes an output connected to a first input of the multiplexer 1195 and a second input of the multiplexer 1110. In one configuration, the multiplexer 1195 includes a second input to receive a control value CTR.

In this configuration, the key generator 270 can generate the output 1198 based on the hidden content 245. In one aspect, the multiplexers 1110, 1170, 1190, 1195 can be configured to perform following operations:

$y=x\text{*ctr*hidden content}; z=y+\text{hidden content};$ $x=x\text{*}x+y; x=(x\text{»}32)|(x\text{«}32);$ /* round 1 */

$x=x\text{*}x+z; x=(x\text{»}32)|(x\text{«}32);$ /* round 2 */

$x=x\text{*}x+y; x=(x\text{»}32)|(x\text{«}32);$ /* round 3 */ return $(x\text{*}x+z)\text{»}32;$ /* round 4 */

In one aspect, the key generator 270 operates as a pseudo random number generator to generate the output 1198 different from the hidden content from the hidden content 245 in a pseudo random manner. The output 1198 may be provided as the key 125 for enabling access to the SRAM 160. Accordingly, the hidden content 245 for enabling access to the SRAM 160 can be hidden from an external device.

Figure 12:
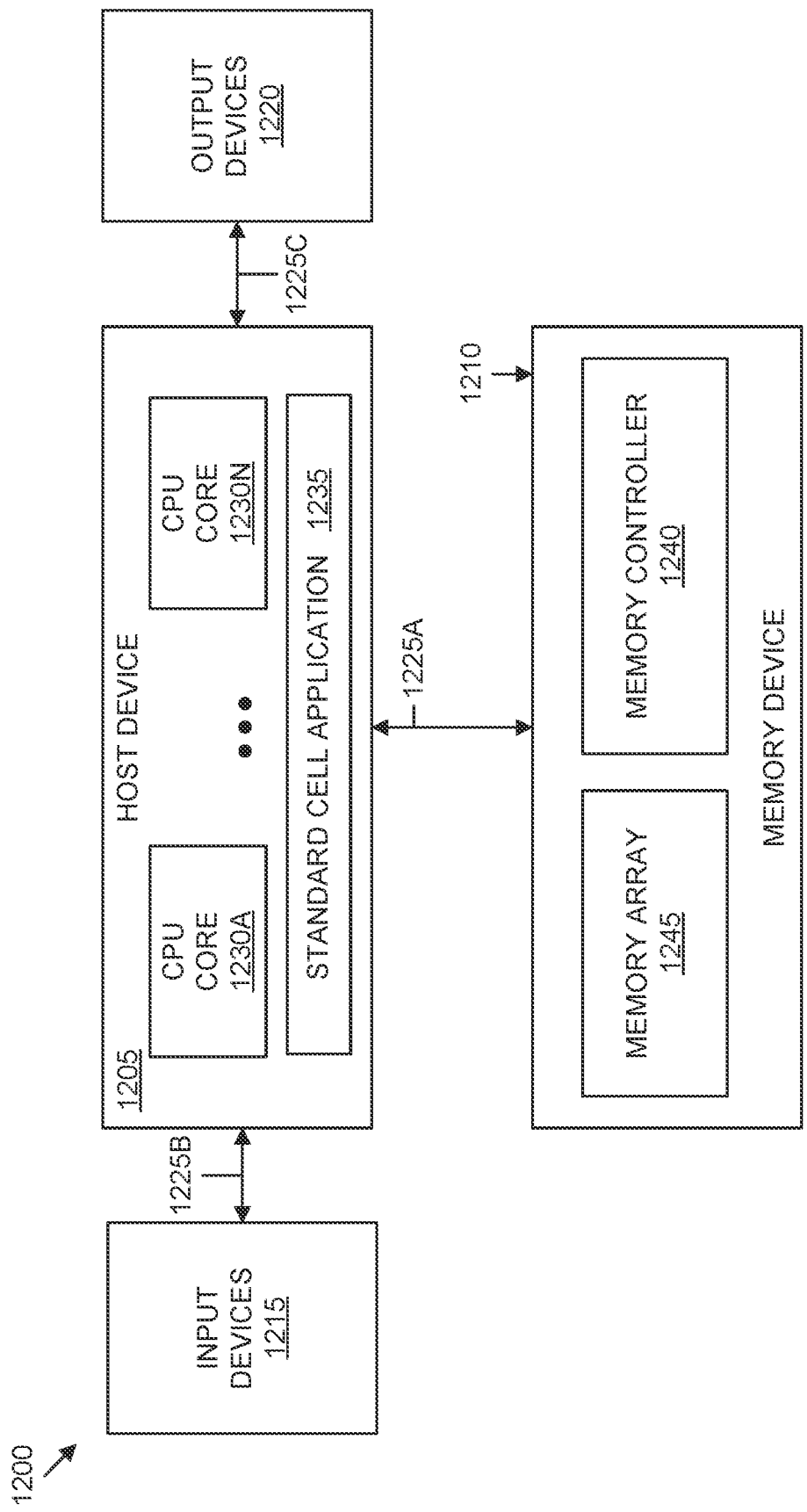
FIG. 12 is an example block diagram of a computing system, in accordance with some embodiments.

Referring now to FIG. 12, an example block diagram of a computing system 1200 is shown, in accordance with some embodiments of the disclosure. The computing system 1200 may be used by a circuit or layout designer for integrated circuit design. A "circuit" as used herein is an interconnection of electrical components such as resistors, transistors, switches, batteries, inductors, or other types of semiconductor devices configured for implementing a desired functionality. The computing system 1200 includes a host device 1205 associated with a memory device 1210. The host device 1205 may be configured to receive input from one or more input devices 1215 and provide output to one or more output devices 1220. The host device 1205 may be configured to communicate with the memory device 1210, the input devices 1215, and the output devices 1220 via appropriate interfaces 1225A, 1225B, and 1225C, respectively. The computing system 1200 may be implemented in a variety of computing devices such as computers (e.g., desktop, laptop, servers, data centers, etc.), tablets, personal digital assistants, mobile devices, other handheld or portable devices, or any other computing unit suitable for performing schematic design and/or layout design using the host device 1205.

The input devices 1215 may include any of a variety of input technologies such as a keyboard, stylus, touch screen, mouse, track ball, keypad, microphone, voice recognition, motion recognition, remote controllers, input ports, one or more buttons, dials, joysticks, and any other input peripheral that is associated with the host device 1205 and that allows an external source, such as a user (e.g., a circuit or layout designer), to enter information (e.g., data) into the host device and send instructions to the host device. Similarly, the output devices 1220 may include a variety of output technologies such as external memories, printers, speakers, displays, microphones, light emitting diodes, headphones, video devices, and any other output peripherals that are configured to receive information (e.g., data) from the host device 1205. The "data" that is either input into the host device 1205 and/or output from the host device may include any of a variety of textual data, circuit data, signal data, semiconductor device data, graphical data, combinations thereof, or other types of analog and/or digital data that is suitable for processing using the computing system 1200.

The host device 1205 includes or is associated with one or more processing units/processors, such as Central Processing Unit ("CPU") cores 1230A-1230N. The CPU cores 1230A-1230N may be implemented as an Application Specific Integrated Circuit ("ASIC"), Field Programmable Gate Array ("FPGA"), or any other type of processing unit. Each of the CPU cores 1230A-1230N may be configured to execute instructions for running one or more applications of the host device 1205. In some embodiments, the instructions and data to run the one or more applications may be stored within the memory device 1210. The host device 1205 may also be configured to store the results of running the one or more applications within the memory device 1210. Thus, the host device 1205 may be configured to request the memory device 1210 to perform a variety of operations. For example, the host device 1205 may request the memory device 1210 to read data, write data, update or delete data, and/or perform management or other operations. One such application that the host device 1205 may be configured to run may be a standard cell application 1235. The standard cell application 1235 may be part of a computer aided design or electronic design automation software suite that may be used by a user of the host device 1205 to use, create, or modify a standard cell of a circuit. In some embodiments, the instructions to execute or run the standard cell application 1235 may be stored within the memory device 1210. The standard cell application 1235 may be executed by one or more of the CPU cores 1230A-1230N using the instructions associated with the standard cell application from the memory device 1210. In one example, the standard cell application 1235 allows a user to utilize pre-generated schematic and/or layout designs of the integrated circuit 120 or a portion of the integrated circuit 120 to aid integrated circuit design. After the layout design of the integrated circuit is complete, multiples of the integrated circuit, for example, including the integrated circuit 120 or a portion of the integrated circuit 120 can be fabricated according to the layout design by a fabrication facility.

Referring still to FIG. 12, the memory device 1210 includes a memory controller 1240 that is configured to read data from or write data to a memory array 1245. The memory array 1245 may include a variety of volatile and/or non-volatile memories. For example, in some embodiments, the memory array 1245 may include NAND flash memory cores. In other embodiments, the memory array 1245 may include NOR flash memory cores, SRAM cores, Dynamic Random Access Memory (DRAM) cores, Magnetoresistive Random Access Memory (MRAM) cores, Phase Change Memory (PCM) cores, Resistive Random Access Memory (ReRAM) cores, 3D XPoint memory cores, ferroelectric random-access memory (FeRAM) cores, and other types of memory cores that are suitable for use within the memory array. The memories within the memory array 1245 may be individually and independently controlled by the memory controller 1240. In other words, the memory controller 1240 may be configured to communicate with each memory within the memory array 1245 individually and independently. By communicating with the memory array 1245, the memory controller 1240 may be configured to read data from or write data to the memory array in response to instructions received from the host device 1205. Although shown as being part of the memory device 1210, in some embodiments, the memory controller 1240 may be part of the host device 1205 or part of another component of the computing system 1200 and associated with the memory device. The memory controller 1240 may be implemented as a logic circuit in either software, hardware, firmware, or combination thereof to perform the functions described herein. For example, in some embodiments, the memory controller 1240 may be configured to retrieve the instructions associated with the standard cell application 1235 stored in the memory array 1245 of the memory device 1210 upon receiving a request from the host device 1205.

It is to be understood that only some components of the computing system 1200 are shown and described in FIG. 12. However, the computing system 1200 may include other components such as various batteries and power sources, networking interfaces, routers, switches, external memory systems, controllers, etc. Generally speaking, the computing system 1200 may include any of a variety of hardware, software, and/or firmware components that are needed or considered desirable in performing the functions described herein. Similarly, the host device 1205, the input devices 1215, the output devices 1220, and the memory device 1210 including the memory controller 1240 and the memory array 1245 may include other hardware, software, and/or firmware components that are considered necessary or desirable in performing the functions described herein.

One aspect of this description relates to an integrated circuit. In some embodiments, the integrated circuit includes one time programmable (OTP) memory device. In some embodiments, the integrated circuit includes a controller coupled to the OTP memory device. In some embodiments, the controller is configured to receive a set of input bits indicative of an input address of the OTP memory device, and obtain hidden content stored by the OTP memory device at a hidden address through a number of indirection processes based on the input address. In some embodiments, each indirection process includes i) identifying a subsequent address of the OTP memory device based on content stored by the OTP memory device at an address, and ii) obtaining subsequent content stored by the OTP memory device at the subsequent address. In some embodiments, the controller is configured to generate a key, based on the hidden content stored by the OTP memory device at the hidden address.

One aspect of this description relates to a method of granting access to content stored by an integrated circuit. In some embodiments, the method includes receiving, by a controller, a set of input bits indicative of a first address of one time programmable (OTP) memory device. In some embodiments, the method includes obtaining, by the controller, a first content stored by the OTP memory device at the first address. In some embodiments, the method includes obtaining, by the controller, a second address of the OTP memory device based on the first content. In some embodiments, the method includes obtaining, by the controller, a second content stored by the OTP memory device at the second address. In some embodiments, the method includes generating, by the controller, a key based on the second content.

One aspect of this description relates to a method of granting access content stored by an integrated circuit. In some embodiments, the method includes receiving, by a controller, a set of input bits. In some embodiments, the method includes converting, by the controller, the set of input bits into an input address, according to a hash function. In some embodiments, the method includes applying, by the controller, the input address to a one time programmable (OTP) memory device. In some embodiments, the method includes generating, by the controller, a key to the set of input bits based on hidden content stored by the OTP memory device according to the input address applied.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit comprising:
   one time programmable (OTP) memory device; and
   a controller coupled to the OTP memory device, wherein the controller includes programmed instructions that when executed cause the controller to:
      receive a set of input bits indicative of an input address of the OTP memory device,
      obtain hidden content stored by the OTP memory device at a hidden address through a number of indirection processes based on the input address, wherein each indirection process includes i) identifying a subsequent address of the OTP memory device based on content stored by the OTP memory device at an address, and ii) obtaining subsequent content stored by the OTP memory device at the subsequent address;
      identify the subsequent address of the OTP memory device based on the content stored by the OTP memory device at the address by converting the content stored by the OTP memory device at the address having a first number of bits to the subsequent address of the OTP memory device having a second number of bits lower than the first number of bits, and
      generate a key based on the hidden content stored by the OTP memory device at the hidden address.

2. The integrated circuit of claim 1, wherein the controller is to:
   obtain the input address of the OTP memory device based on a portion of the set of input bits,
   obtain a first content stored by the OTP memory device at the input address, and
   obtain a second address of the OTP memory device according to the first content.

3. The integrated circuit of claim 1, wherein the controller includes a set of XOR gates to convert, for each indirection process, the content stored by the OTP memory device at the address having the first number of bits to the subsequent address of the OTP memory device having the second number of bits.

4. The integrated circuit of claim 1, wherein the set of input bits indicates a process to apply for converting the content stored by the OTP memory device into the subsequent address of the OTP memory device, wherein the controller is to:
   select the process indicated by the set of input bits, and
   convert, for each indirection process, the content stored by the OTP memory device into the subsequent address of the OTP memory device through the selected process.

5. The integrated circuit of claim 1, wherein the set of input bits is indicative of the number of indirection processes to apply to generate the key, wherein the controller is to obtain the hidden content stored by the OTP memory device at the hidden address through the number of indirection processes.

6. The integrated circuit of claim 1, wherein the controller is to:

obtain the input address of the OTP memory device by converting a portion of the set of input bits according to a hash function.

7. The integrated circuit of claim 6, wherein the controller includes:
a shift register to shift the portion of the set of input bits, and
a hash logic circuit to apply i) the portion of the set of input bits and ii) the shifted portion of the set of input bits to the hash function to obtain the input address.

8. The integrated circuit of claim 7, wherein the shift register shifts the input bits according to a function.

9. The integrated circuit of claim 1, wherein the controller is to:
convert the hidden content stored by the OTP memory device at the hidden address into the key according to a hash function.

10. The integrated circuit of claim 9, wherein the controller includes:
a shift register to shift a portion of the set of input bits, and
a hash logic circuit to apply i) the hidden content stored by the OTP memory device at the hidden address and ii) the shifted portion of the set of input bits to the hash function to generate the key.

11. The integrated circuit of claim 10, wherein the shift register shifts the input bits according to a function.

12. A method comprising:
receiving, by a controller, a set of input bits indicative of a first address of one time programmable (OTP) memory device;
obtaining, by the controller, a first content stored by the OTP memory device at the first address;
obtaining, by the controller, a second address of the OTP memory device based on the first content by converting the first content having a first number of bits to the second address having a second number of bits lower than the first number of bits;
obtaining, by the controller, a second content stored by the OTP memory device at the second address; and
generating, by the controller, a key based on the second content.

13. The method of claim 12, wherein the set of input bits additionally indicates a number of indirection processes to apply to generate the key, wherein each indirection process includes i) identifying a subsequent address of the OTP memory device based on content stored by the OTP memory device at an address, and ii) obtaining subsequent content stored by the OTP memory device at the subsequent address, the method further comprising:
obtaining, by the controller, a hidden content stored by the OTP memory device at a hidden address through the number of indirection processes indicated by the set of input bits.

14. The method of claim 13, wherein generating the key includes converting the hidden content according to a hash function to obtain the key.

15. The method of claim 12, wherein the set of input bits indicates a process to apply for converting the first content stored by the OTP memory device into the second address of the OTP memory device, the method further comprising:
selecting, by the controller, the process to apply indicated by the set of input bits; and
convert the first content stored by the OTP memory device into the second address of the OTP memory device through the process.

16. The method of claim 12, further comprising:
obtaining, by the controller, the first address of the OTP memory device by converting a portion of the set of input bits according to a hash function.

17. A method comprising:
receiving, by a controller, a set of input bits;
converting, by the controller, the set of input bits into an input address, according to a hash function, wherein converting the set of input bits into the input address includes:
shifting, by a shift register, a portion of the set of input bits, and
applying, by a hash generator, i) the portion of the set of input bits and ii) the shifted portion of the set of input bits to the hash function to generate the input address;
applying, by the controller, the input address to a first memory device;
generating, by the controller, a key based on hidden content stored by the first memory device according to the input address applied; and
accessing content stored by a second memory device based on the key.

18. The method of claim 17, wherein the shift register shifts the portion of the set of input bits according to a number of bits to shift indicated by the set of input bits.

19. The method of claim 17, further comprising:
obtaining, by the controller, the hidden content stored by the first memory device through a number of indirection processes based on the input address, each indirection process including i) identifying a subsequent address of the first memory device based on content stored by the first memory device at an address, and ii) obtaining subsequent content stored by the first memory device at the subsequent address.

20. The method of claim 17, wherein the shift register shifts the input bits according to a function.

* * * * *

UNITED STATES PATENT AND TRADEMARK OFFICE
CERTIFICATE OF CORRECTION

| | | |
|---|---|---|
| PATENT NO. | : 12,184,795 B2 | Page 1 of 1 |
| APPLICATION NO. | : 17/228840 | |
| DATED | : December 31, 2024 | |
| INVENTOR(S) | : Lu et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 728 days.

Signed and Sealed this
Twenty-fourth Day of June, 2025

Coke Morgan Stewart
*Acting Director of the United States Patent and Trademark Office*